(12) United States Patent
Amanna, III et al.

(10) Patent No.: US 9,391,749 B2
(45) Date of Patent: Jul. 12, 2016

(54) SYSTEM AND METHOD FOR DISTRIBUTED DATA MANAGEMENT IN WIRELESS NETWORKS

(71) Applicants: Ashwin Amanna, III, Leesburg, VA (US); Joseph Mitola, III, St. Augustine, FL (US); Thomas Charles Clancy, III, Washington, DC (US); Jeffrey H. Reed, Blacksburg, VA (US); Robert W. McGwier, Blacksburg, VA (US); Seth Hitefield, Blacksburg, VA (US); Andrew Pham, Blacksburg, VA (US); Sergio Bernales, Blacksburg, VA (US); Michael Fowler, Blacksburg, VA (US)

(72) Inventors: Ashwin Amanna, III, Leesburg, VA (US); Joseph Mitola, III, St. Augustine, FL (US); Thomas Charles Clancy, III, Washington, DC (US); Jeffrey H. Reed, Blacksburg, VA (US); Robert W. McGwier, Blacksburg, VA (US); Seth Hitefield, Blacksburg, VA (US); Andrew Pham, Blacksburg, VA (US); Sergio Bernales, Blacksburg, VA (US); Michael Fowler, Blacksburg, VA (US)

(*) Notice: Subject to any disclaimer, the term of this patent is extended or adjusted under 35 U.S.C. 154(b) by 115 days.

(21) Appl. No.: 13/834,826

(22) Filed: Mar. 15, 2013

(65) Prior Publication Data

US 2014/0269284 A1 Sep. 18, 2014

Related U.S. Application Data

(60) Provisional application No. 61/785,906, filed on Mar. 14, 2013.

(51) Int. Cl.
| | |
|---|---|
| *H04W 28/10* | (2009.01) |
| *H04L 5/00* | (2006.01) |
| *H04L 12/815* | (2013.01) |
| *H04W 72/10* | (2009.01) |

(52) U.S. Cl.
CPC ............. *H04L 5/0037* (2013.01); *H04L 47/22* (2013.01); *H04W 72/10* (2013.01)

(58) Field of Classification Search
CPC ....... H04L 5/0037; H04L 47/22; H04W 4/00; H04W 72/10
USPC ...................................................... 370/230.1
See application file for complete search history.

(56) References Cited

U.S. PATENT DOCUMENTS

| | | | | |
|---|---|---|---|---|
| 8,635,347 | B2* | 1/2014 | Sanders ..................... | 709/228 |
| 8,797,894 | B2* | 8/2014 | Bonald et al. ............. | 370/252 |
| 2002/0116545 | A1* | 8/2002 | Mandato et al. .......... | 709/328 |
| 2003/0085888 | A1* | 5/2003 | Lafruit ....................... | 345/419 |
| 2005/0157660 | A1* | 7/2005 | Mandato et al. .......... | 370/254 |
| 2007/0195787 | A1* | 8/2007 | Alnuweiri et al. ........ | 370/395.4 |
| 2008/0298230 | A1* | 12/2008 | Luft et al. .................. | 370/219 |
| 2008/0298237 | A1* | 12/2008 | Dos Remedios et al. .. | 370/233 |
| 2009/0161541 | A1* | 6/2009 | Harhira et al. ............ | 370/230.1 |
| 2010/0142447 | A1* | 6/2010 | Schlicht et al. ........... | 370/328 |
| 2014/0064077 | A1* | 3/2014 | Chorafakis et al. ....... | 370/230.1 |

\* cited by examiner

*Primary Examiner* — Jay P Patel
(74) *Attorney, Agent, or Firm* — Finnegan, Henderson, Farabow, Garrett & Dunner, LLP (57) ABSTRACT

Described are systems and methods for managing data traffic to a plurality of mobile devices over a wireless network. For each mobile device, a facility is provided that is capable of:
  (i) assigning a utility function to mathematically represent the value of a plurality of applications running on that mobile device with respect to a factor, (ii) aggregating the plurality of utility functions to generate an aggregated utility function corresponding to that mobile device, and
  (ii) communicating at least one of the associated aggregate utility function and a bid price based on the associated aggregate utility function over a network. A resource allocation is determined among a plurality of mobile devices based on a bidding process which accounts for the aggregate utility functions, and the data traffic between the mobile devices and the resource is managed using a network traffic shaping element according to the resource allocation.

14 Claims, 7 Drawing Sheets

SYSTEM AND METHOD FOR DISTRIBUTED DATA MANAGEMENT IN WIRELESS NETWORKS

FIELD

This disclosure relates to a system and method for wireless communication data management.

BACKGROUND

The proliferation of smartphones has completely changed the traffic characteristics of cellular networks. With multiple applications (apps) on each device often simultaneously downloading email, music, videos, web content, etc., the data load on carriers is heavy and can adversely affect both carriers and users. Additionally, research has shown that almost thirty percent of smartphones have six or more apps running in the background all day. Without incentives to minimize their data loads, many apps have gotten careless in their use of finite network resources.

Advances in modern generation cellular technologies, to include without limitation Long Term Evolution (LTE) and other fourth generation (4G) technologies, have increased overall network capacity, but network resources remain finite and effective data management is crucial. Conventional data management approaches include quality of service (QoS) methods wherein transferred data packets are classified and may be allocated predefined bit rates and minimal latency constraints. Other management techniques include scheduling, bandwidth control, and power manipulation. However, these prior art methods do not always differentiate between various types and purposes of data and can be inefficient and not optimal.

Therefore a need exists for improved management of cellular data traffic.

SUMMARY OF THE INVENTION

Described herein are systems and methods for intelligently shaping the data traffic on a cellular network between end user devices and network services based on a distributed architecture of traffic shaping elements, which also takes into account the management of QoS parameters. This traffic shaping approach uses unique utility functions for specific types of data traffic in order to implement customized shaping and enforcement policies. Aggregate utility functions define device-level application needs and lend themselves to a bidding process for overall resource allocation between devices. The system architecture provides resource allocation and traffic shaping based on the unique needs of user applications and requirements, and distributes the traffic shaping and enforcement at the device level and at the network level.

Much of the data traffic generated by smartphones is of low priority (i.e., is not highly sensitive to QoS or throughput characteristics, while a small amount (e.g. VOIP) is high priority. Broadly speaking, traffic can be broken down into the following classes: a) inelastic traffic that has a low threshold for latency, must be delivered in a certain period of time, and achieve a minimum threshold and b) elastic traffic, also know as "best effort" traffic that represents the majority of traffic generated by apps. This type of traffic can generally be scheduled to "fill in the gaps" between inelastic traffic, as long as the latency is not too high such that the user experience is negatively impacted. By characterizing the type of traffic according to user and application, network resources can be allocated and data managed accordingly.

In particular, as further described below, traffic shaping can be achieved in an intelligent, iterative process whereby data is throttled in a controlled manner, with user experience and utility as critical constraints. A related technique of traffic policing allows noncompliant data packets (whose loss would likely be unknown to the user) to be dropped.

There is no doubt that the cellular industry faces considerable challenges as smartphone usage and data usage are expected to grow. This not only impacts capital expenditures for infrastructure build out and operational expenditures for accommodating peak data surges, but also the potential for degrading quality of experience (QoE) for customers due to dropped calls and poor data throughput. Systems and methods for data management with traffic shaping, such as described herein, address the specific issue of improving the ratio of peak-to-average data usage without requiring significant infrastructure expenditure or incurring noticeable degradation to user QoE.

BRIEF DESCRIPTION OF FIGURES

FIG. 4b provides additional detail for the exemplary system illustrated in FIG. 4a;

DETAILED DESCRIPTION

As an overview, the systems and methods described herein present an approach to shaping data traffic between end-user mobile devices and a network. The main system components include the end-user mobile devices, with applications running in the foreground or background on each device, and traffic shaping elements (traffic shapers) on both the device and at the network. Each application on a device can be associated with a specific utility function, and the needs of each device can be quantified using an aggregator to aggregate the utility functions corresponding to the applications running on that device. An aggregated utility function for each device is generated which enables a bidding process on the network side between multiple devices for allocation of data resources. The network determines a value to place on resources for each device and uses this information in a network resource allocation determination, as well as implements traffic shaping on data flowing between the network and the end-user device.

Figure 1:
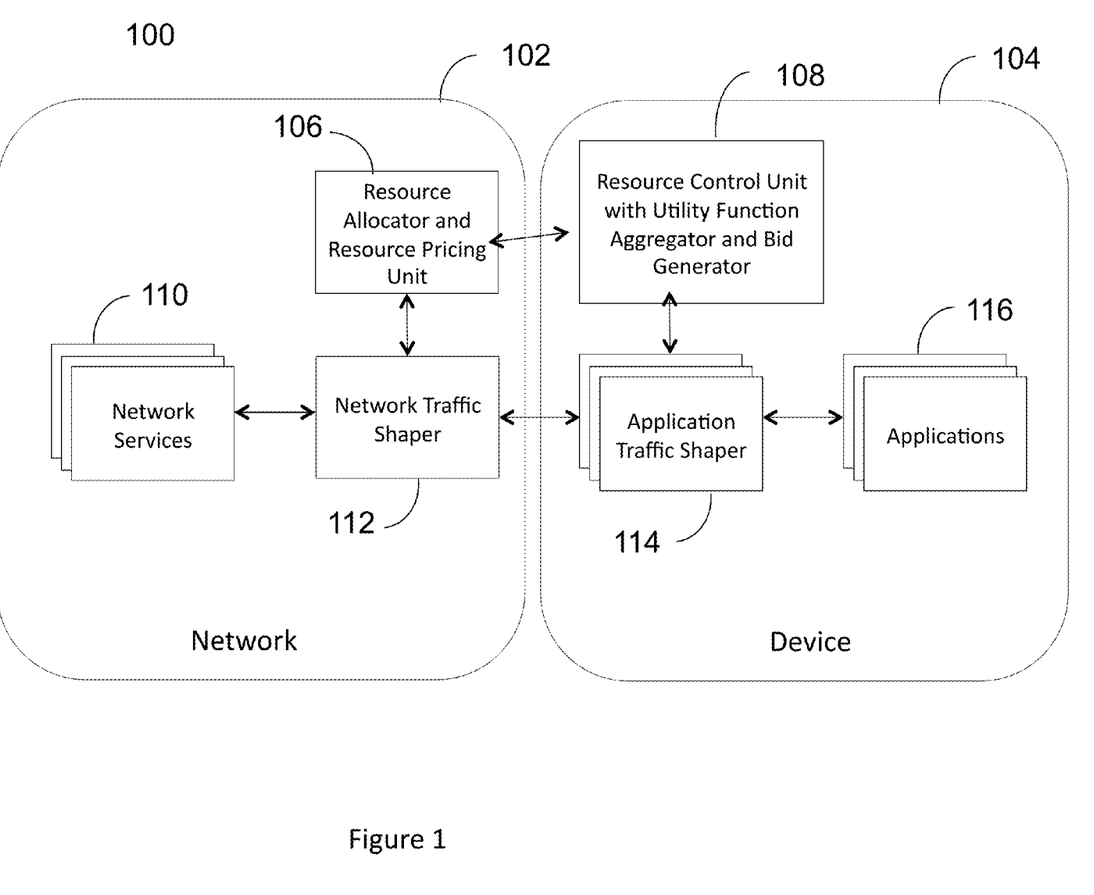
FIG. 1 is a block diagram of an exemplary system for data management.

With reference to FIG. 1, a system 100 for cellular data management includes a network 102 interacting with a plurality of end-user mobile devices, each including a plurality of applications. The network 102 includes network services 110, a resource allocator and pricing unit 106, and a network traffic shaper 112, which performs traffic shaping and can perform also perform traffic policing. Traffic shaping may comprise, for example, delaying data packets by a time interval in order to smooth out bursts, or redirecting such packets to alternative delivery mechanisms, such as different air interface, while traffic policing may comprise completely dropping some data packets.

FIG. 1 depicts network 102 interacting with a single mobile device 104 that includes a plurality of applications 116, a plurality of corresponding application traffic shapers 114, and a resource control unit 108, which includes a utility function aggregator and bid generator. Resource control unit 108, which can be an application layer feature in the form of an agent, monitors running applications and determines data needs for the device.

Data flows both ways between end-user mobile devices and typical network services 110. Each application's data traffic can be managed by running it through a corresponding application level traffic shaper 114 that can time delay the flow of data. Each mobile device's data traffic can be managed by running it through network traffic shaper 112 that can time delay the flow of data.

Each application's performance can be quantified in the form of a corresponding utility function, which is a measure of utility (benefit, goodness, value, or the like) and which may translate a given performance metric, such as bandwidth, onto a normalized scale, such as a scale between [0,1]. For example, a video application requires a certain amount of throughput to provide an acceptable viewing experience. In contrast, background advertising can operate on much less throughput without the user noticing degradation. Therefore, the specific shape of the utility functions for these two applications would be different. At the same low level of throughput, the utility for the background application would be much higher than the throughput utility of the video application, because the advertising application delivers its intended value, while the video application does not. At high throughput, the utility of the video application might exceed that of the advertising application, because the absolute value of the video application (when working well) might excel that of the advertising application. Utility functions can take various forms (normalized sigmoid, logarithmic, threshold functions, step functions, delta functions, sloped curves, etc.) and can be defined for a variety of different performance metrics, such as throughput, packet error rate, latency/lag, etc. In some embodiments, such as when the performance metric is throughput, each application's utility function may be represented by a normalized sigmoid defined by an inflection point, the inflection point reflecting a level of throughput that indicates an adequate level of throughput to provide a satisfactory user experience for that application. Any shape utility function can be used, each preferably having one or more local maxima.

It may be noted that various factors could be considered in developing a utility function, including utility for users (either expressed directly or as reflected by their activity or purchase behavior), utility for network operators, or utility assigned by other stakeholders, such as government entities (e.g., those responsible for first responder applications). A wide range of individual and social utility metrics might be associated and considered within the utility function ascribed to an application. Such a function also might incorporate utility associated with a user of a device. For example, the utility for an application being used by a high value user (e.g., a premium subscriber, long time customer, or the like) might be higher than the utility for the same application being used by a different user. Thus, utility may be not only application-sensitive, but also user-sensitive.

The utility functions for the applications may be adjusted through normalization procedures in order to compare them on a common scale. Because of this, they can then be combined to form a single overall or aggregate utility function corresponding to a given device 104 by utility function aggregator of resource control unit 108. Further, the resource control unit 108 may generate a bid for resources based on the aggregate utility function, which may then be communicated to the resource allocator and pricing unit 106 that determines the cost per unit of resource for each end user device and allocates data resources between devices on the network via a resource bidding process. Aggregation of multiple device utility functions is defined as an output (e.g., a product, sum, or other function) based on each device's aggregate utility function. In embodiments using the product of device utility functions, this may produce a convex aggregate that lends itself to conventional optimization techniques, resulting in quick convergence across the network.

One potential approach for bidding for resources is based on identifying a notional price for resource blocks that optimizes the needs of the users. This notional price may or may not be related to actual dollars and is often referred to as a shadow price. The needs of the users are reflected in the aggregate utility functions for each device, which are based on the specific applications running on each device. In this manner, the utility functions of individual phones are incorporated in identifying bid prices. For example, users may start bidding equal amounts for a resource block, such as a notional value of 1. These initial bid prices can simply be added together and divided by the overall available resource to determine the first iteration of the cost of a resource block. The resources allocated are calculated by taking the user's initial bid price and dividing by the bid price by the price of the resource block. Recall that utility functions are evaluated at a specific resource allocation. Therefore, each user can identify what their ideal allocation should be based on their utility function at this current resource allocation. Identification of an a user's ideal resource allocation can be performed by maximizing a function that incorporates the devices aggregate utility function, evaluated at the current resource allocation and the current cost for a resource block. The newly identified ideal resource allocation for an individual device drives the next iteration of the bidding process such that the new bid price is the product of the current ideal resource allocation and the current cost of a resource block. A new resource block cost is then determined in the same manner as before where the cost is the sum of all the current bids divided by the total resources available. This iterative bidding process continues until the awarded resource allocation for each device is equivalent to the devices ideal allocation based on the devices aggregate utility function. Other types of converging optimization such as heuristic searches may be used as would be understood by those skilled in the art. In more detail, still referring to the system in FIG. 1, the bidding process is facilitated by resource allocator and pricing unit 106, which is independent from the shaping processes at network traffic shaper 112 and application traffic shaper 114.

The bidding process provides resource stability. The mobile devices can convey defining information about their utility functions within their bid submission. This information can optionally include quantitative description of the utility function, such as location of the nearest inflection point to the bid or the slope of the utility function at the bid price. This optional information provides the bidding process insight into how a specific pricing structure will affect the user's future bids and allow for optimized approaches to minimize the volatility in the bidding process and price convergence. As mentioned, resource control unit 106 enables bid submission. However, operation is not dependent on an end-user mobile device participating in the process, such as if the application feature is not present on the user device. In this case, the network can utilize default utility functions and bid prices for the device based on predefined agreements. One potential embodiment of such a predefined agreement might be a monthly rate plan.

The architecture of the exemplary system of FIG. 1, with traffic shaping elements distributed between the device and the network, provides several advantages. The network can perform traffic shaping based on a total resource allocation to a specific device with prioritization based on the type of user. One potential exemplary application is providing a public safety user with a higher priority than a private citizen. Similarly, device 104 can perform traffic shaping based on corresponding utility functions of individual applications 116 with prioritization based on the type of application. For example, a video streaming application would typically have a higher priority than a background update. In embodiments, utility functions may include multi-factor consideration of device, user and application characteristics, as well as context characteristics (such as a user's location, or the context of use of an application) allowing a high degree of situation-specificity in the utility function. As an example of context specificity, an application such as a browser might have a higher utility function if the browser has navigated to a "high value" page, such as the checkout page of an e-commerce website. In such situations, it may be noted that embodiments of a bidding process could include bidding from third party sources, such as content providers, e-commerce providers, or the like, thus increasing the utility function for devices when context indicates additional value to such providers.

Figure 2:
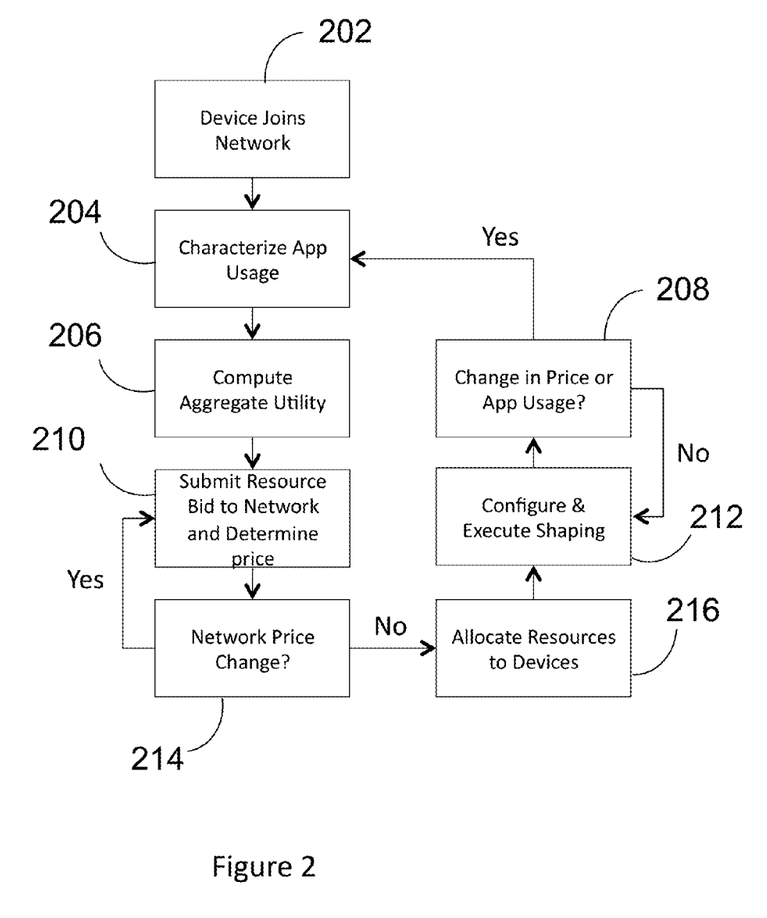
FIG. 2 is a flow diagram of exemplary operation of the system of FIG. 1 upon system start-up.

Novel process flows are presented when a new device joins the network or an existing device's usage profile changes. Referring to FIG. 2, an exemplary method is illustrated for operation of the system 100 when a new device joins the network 102 at step 202. At step 204, the application usage of the newly joined device is characterized via the assignment of an appropriate utility function to each running application by resource control unit 106. This step takes into account the different types of applications, such as voice, video, or data, as well as their corresponding potential tolerance to elasticity at the available bandwidth. As previously described, an elastic application is able to tolerate reduction in available bandwidth without negatively affecting the user quality of experience. In contrast, an inelastic application's performance will degrade when operated in a constrained bitrate environment, consequently degrading the user's quality of experience. Digital voice transmission is an example of an inelastic application.

As a step 206, resource control unit 108 aggregates the utility functions of all the applications on the device into a single aggregated utility function for the device. Based on the device's aggregate utility function, an initial bid is submitted to the network for requesting resources at step 210. An iterative process takes place such that the bid pricing converges to a final price based on the interaction of multiple users with the system and the price is conveyed to the mobile device. At 214, a determination is made whether or not there has been a change in network price compared to a previous iteration. If yes, then processing proceeds back to step 210 and a new resource bid is submitted. If no, then processing proceeds to step 216. At 216, upon convergence of a price, resources are allocated to the devices on the network and processing proceeds to a step 212. At 212, network traffic shaping is configured based on the device allocation and device traffic shaping is configured based on the available resources at each device. At 208, a determination is made whether a device has changed its application usage or whether pricing has changed because of activity of other users. If so, then processing proceeds to step 204, and the application usage is re-characterized. If not, then processing proceeds to step 212.

FIG. 2 thus illustrates an iterative process for resources bidding and further support for resource stability via invitation for rebid. Every time a new user hands off into the area or the usage profile of a phone changes significantly, there is potential that the entire network pricing for all users could change. To avoid having to redo the bidding process for all the users every time there is fluctuation, a threshold can be set. When a new user join the network, this single user goes through the bidding process and a network price is identified. If this new price differs from the existing price by a threshold amount, such as ten percent, then the entire rebidding process for all users is reinitiated. If this new price for the user is below this predetermined threshold, then this user will retain this different price until such time that the entire network goes through the rebidding process. This helps prevent involving the entire network in every minor resource change in the network by constraining certain rebidding fluctuations to the mobile device only. This minimizes impact on the main network in reaction to each small change in usage, yet enables users to avoid being locked into a price that is not ideal for a new situation. This decreases the volatility of the resource pricing which enables greater network stability.

Figure 3:
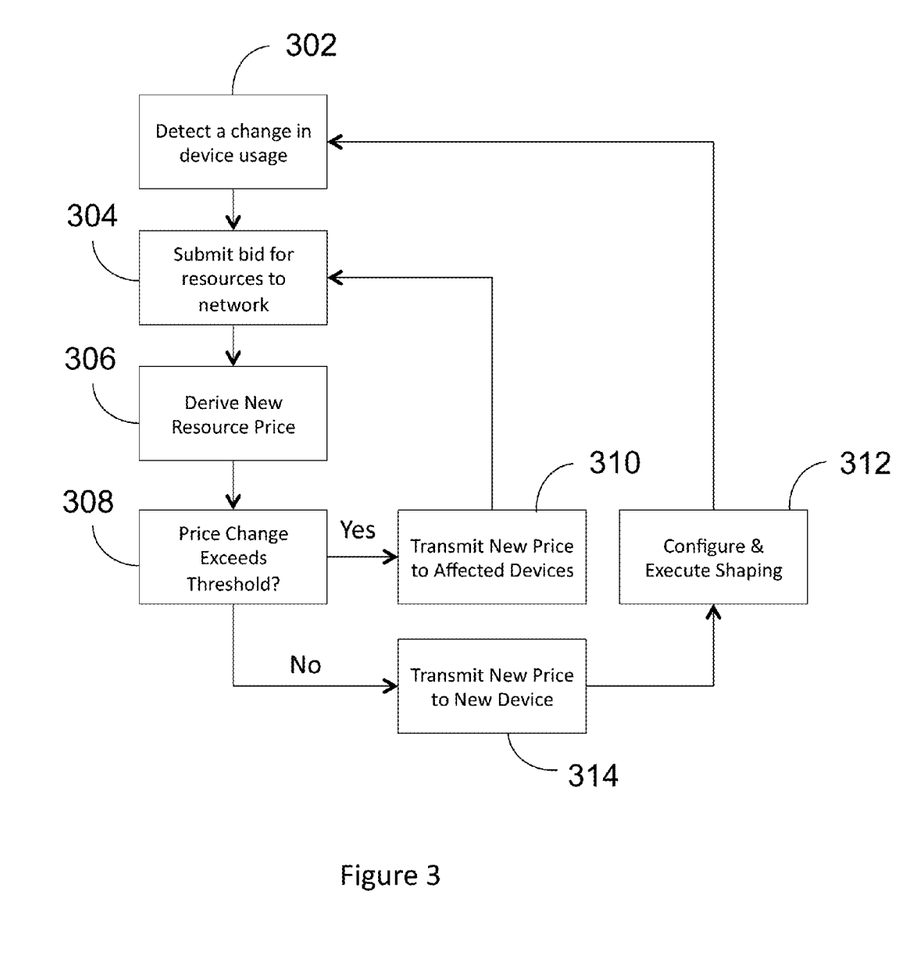
FIG. 3 is a flow diagram of exemplary operation of the system of FIG. 1 when system conditions change.

Referring to FIG. 3, an exemplary process flow is illustrated for when the usage of a mobile device 104 may change, in the presence of a predetermined threshold. For example, at a step 302, a resource control unit 108 of device 104 can determine that its application profile has changed, and provide this information to unit 106, and processing proceeds to a step 304. At step 304, a new bid for resources is submitted and accepted by the network, and processing proceeds to a step 306, where a new price is derived for the resource. At a step 308, in order to minimize disruption to other devices on the network, the delta between the new price and the previous price is compared against a predefined threshold. If this delta falls below the threshold, then only the resource pricing of the new current device under consideration is affected, and processing proceeds to a step 314. At step 314, a new price is issued to the device, and processing proceeds to a step 312. If, however, the difference between the new price and the previous price exceeds the predefined threshold, then it is necessary to inform other devices on the network that the current pricing for all devices will require renegotiation, and processing proceeds from step 308 to step 310. At step 310, the new price is transmitted to the affected devices, and then the process returns to the bid submission step 304. At step 312, upon receipt of a new price, the device proceeds to implement the device-level traffic shaping. The process remains at this stage of operations until such time that device usage changes which returns the process flow to the beginning step 302.

Figure 4A:
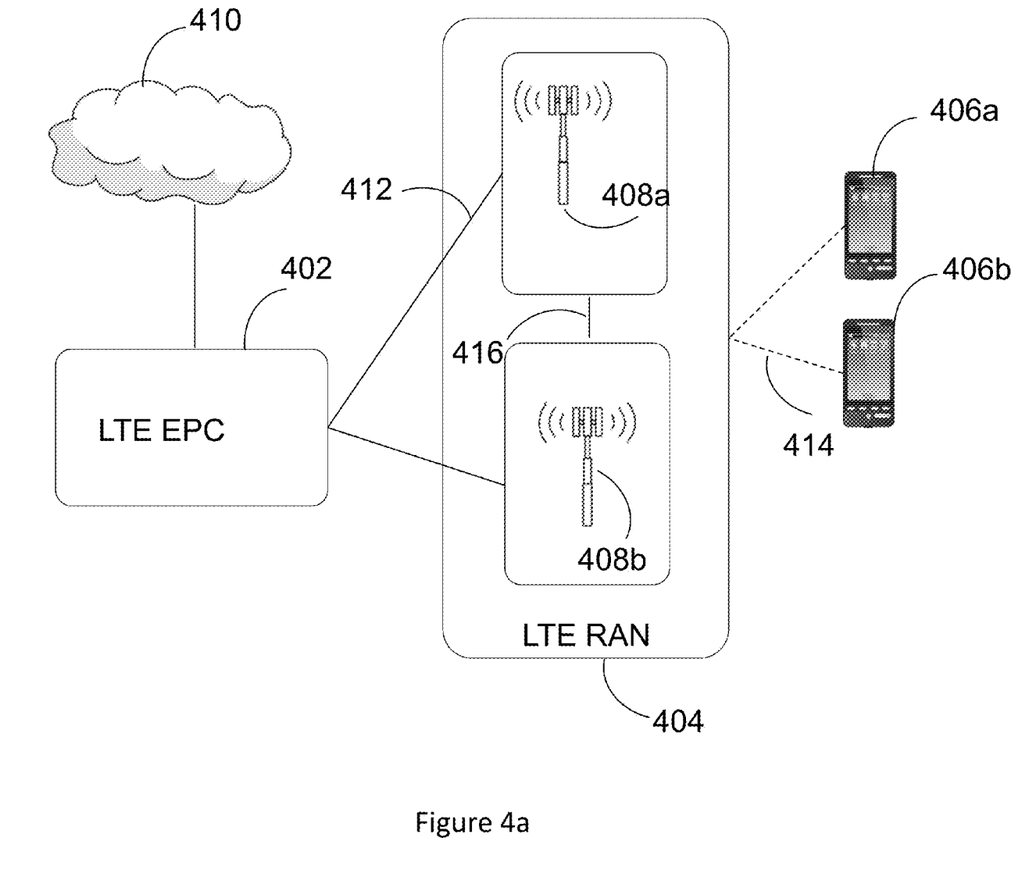
FIG. 4a is an illustration of exemplary system architecture for a fourth generation (4G) cellular system.
Figure 4B:
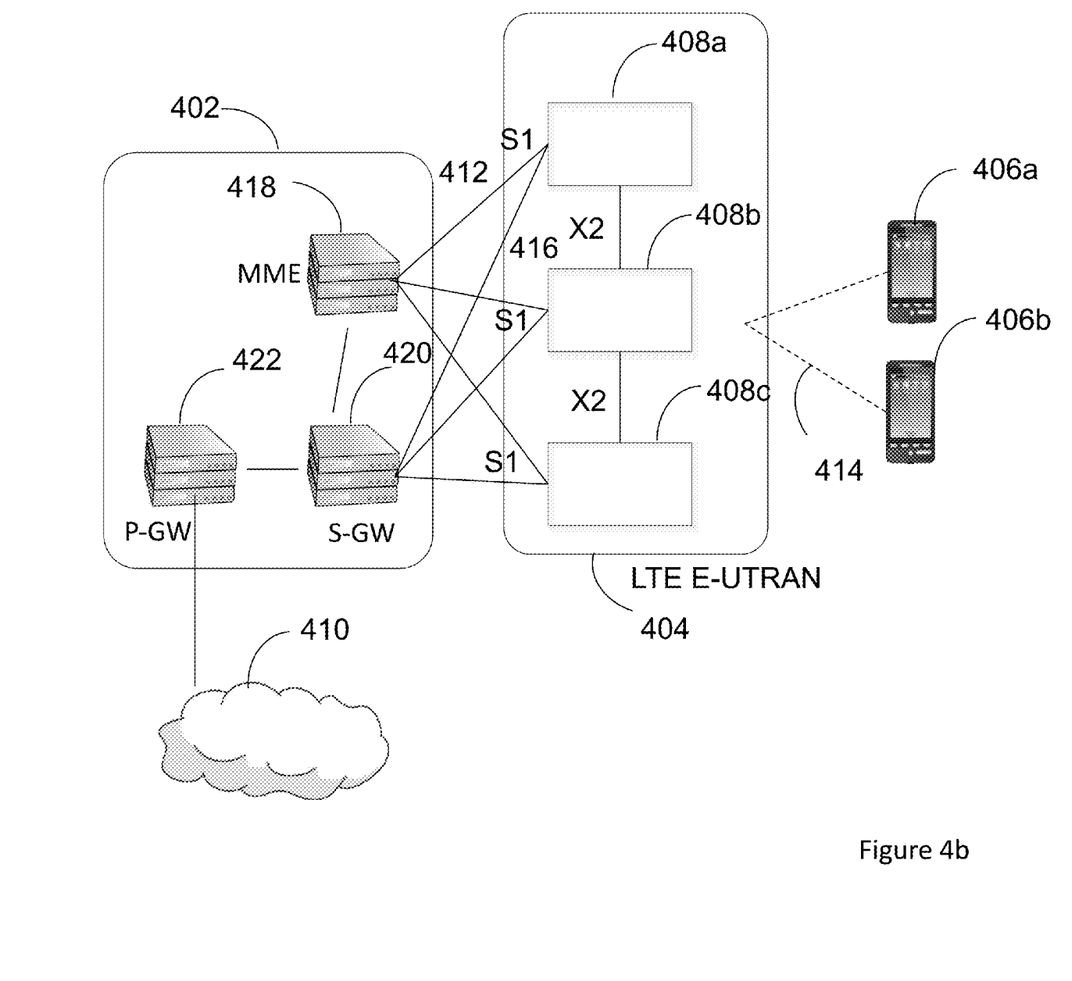

With reference to FIGS. 4a and 4b, illustrated is an exemplary embodiment of a current state of the art fourth generation cellular system known as long term evolution (LTE). Mobile devices 406a-b may connect wirelessly over an air-interface 414 to the LTE RAN (radio access network) (E-UTRAN) 404. The RAN 404 includes individual cellular towers 408a-b known as eNodeB's. The RAN 404 interacts with network control that located within an evolved packet core (EPC) 402. The RAN 404 communicates with the EPC 402 using the Si interface 412. Finally the EPC 402 connects to the internet services 410.

Further details of the RAN 404 and the EPC 402 are shown in FIG. 4b. The enodeB's 408a-c connect to a mobility management entity (MME) 418 in the EPC via the Si interface 412. The eNodeB's also connect to a serving gateway 420 and then to the packet gateway 422 before interaction with the internet and other network services 410.

Figure 5:
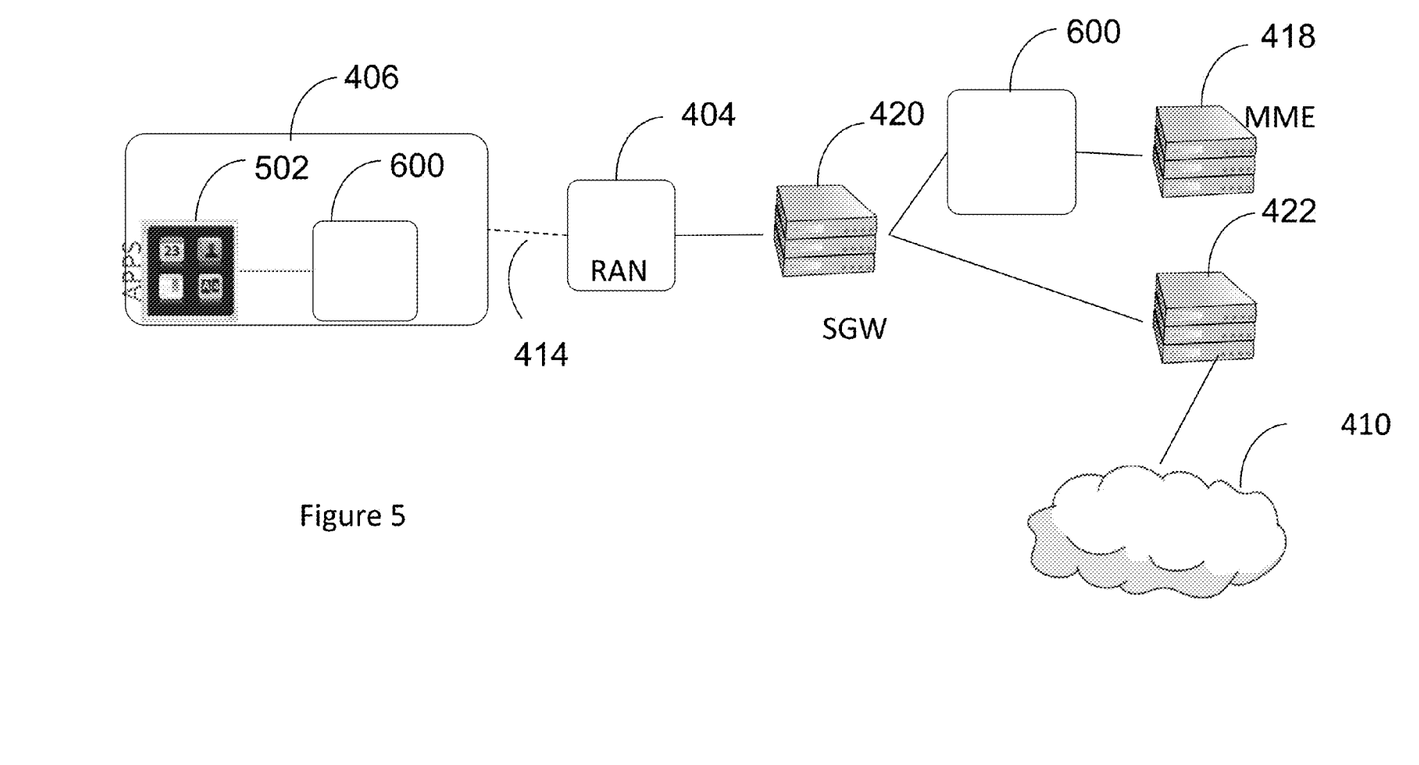
FIG. 5 is an illustration representing an exemplary implementation of a method for data traffic shaping.

An exemplary embodiment of a system for traffic shaping at the network and device levels on such an LTE network is illustrated in FIG. 5. Each device 406 will contain a set of user applications 502 as well as an application-level traffic shaper 600. Packet data transmitted between the device 406 and the RAN 404 is controlled and throttled by said application-level traffic shaping. Data packets flow to the SGW 420 similarly to the existing LTE architecture. A network-level traffic shaper 600 is placed between the SGW 420 and the MME 418.

Figure 6:
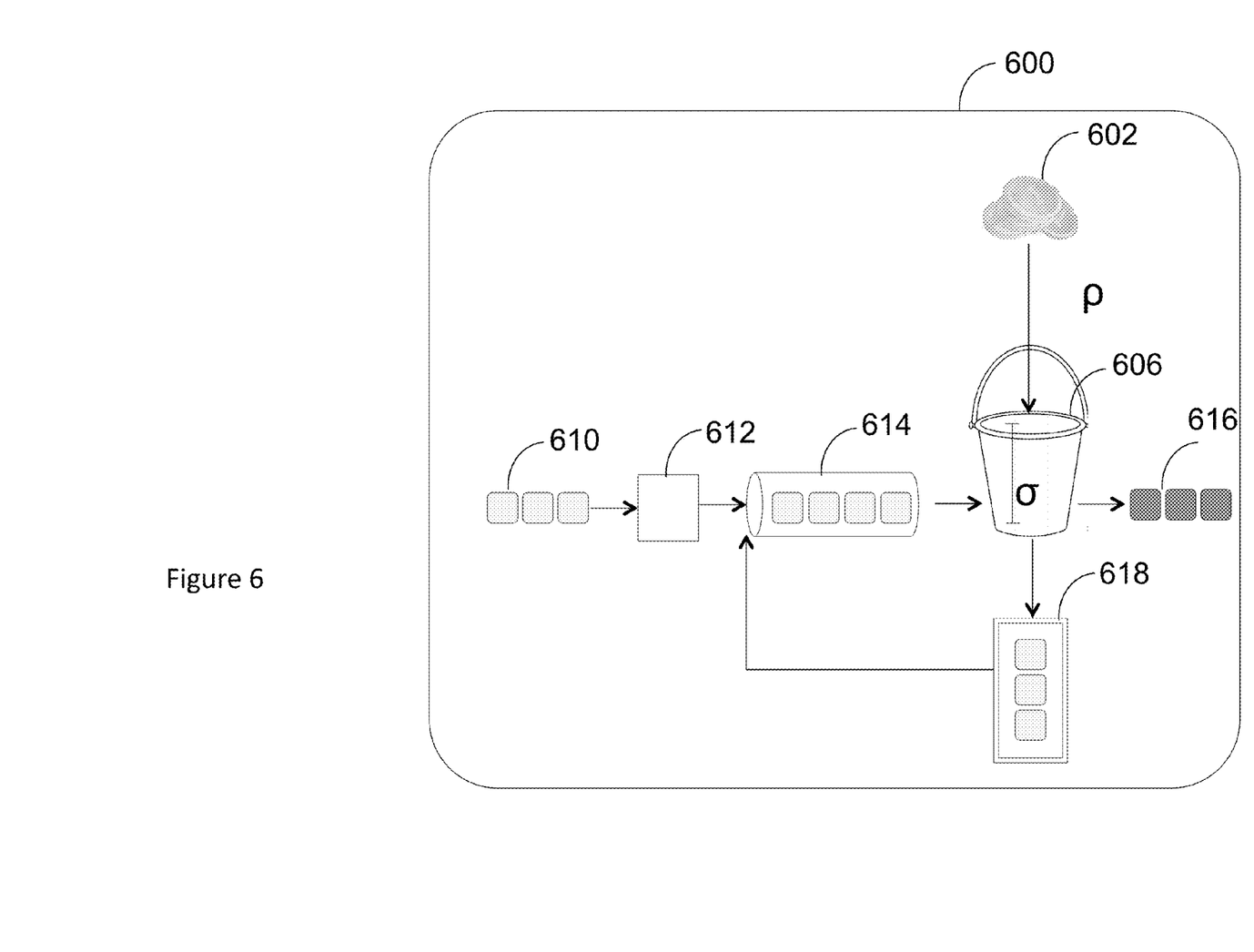
FIG. 6 is a diagram showing an exemplary traffic shaping element known as a token bucket filter.

Referring to FIG. 6, an exemplary embodiment for achieving traffic shaping is described. Without limitation to other embodiments of traffic shaping and enforcement filters, a token bucket filter (TBF) 600 enables control of packet transmission. In general, a TBF 600 controls packet flow by issuing tokens 602 at a specific rate denoted by $\rho$ given in tokens/second. The tokens are stored in a bucket 606 which has a maximum size denoted by $\sigma$. Packets can only be transmitted out if there are tokens in the bucket. If no tokens are present, then the packet is either queued or discarded. Incoming packets 610 are classified by their importance by a classifier 612. This classification determines what happens to the packet in the event that a token is unavailable upon attempted transmission. One potential classification would save the packet transmission at a later time. Alternatively, the packet could be discarded completely if there were no tokens available when transmission was requested. After classification, packets are stored in a buffer 614. The apparatus determines if there are tokens available. If tokens are available, then the packets are transmitted 616 and the total remaining tokens is decremented by the number of packets transmitted. New tokens fill the bucket based on the predefined token fill rate $\rho$. Packets classified for later transmission are stored in a holding queue 618 for a later attempt at transmission.

Intelligent and adaptive configuration of the TBF bucket size 608 and token fill rate $\rho$ is accomplished by machine learning algorithms. This enables customization of these TBF configuration parameters based on the specific needs of the applications (e.g. voice, video, web browsing).

The advantages of the present method and system include a resource bidding process that is separate from the shaping process, an iterative process that converges to an optimal pricing solution, maintenance of resource stability, distributed traffic shaping at both the device level and network level, and definition of unique utility functions that are customized to the type of application and user priority.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

While only a few embodiments of the present invention have been shown and described, it will be obvious to those skilled in the art that many changes and modifications may be made thereunto without departing from the spirit and scope of the present invention as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

What is claimed is:

1. A wireless resource allocation system for a network, comprising:
   one or more mobile devices, each mobile device including a bidding component and a plurality of applications requiring data transfer,
   wherein each bidding component is operable to iteratively generate bids for resources corresponding to data transfer needs of its respective plurality of applications,
   wherein each bid is representative of an estimated utility as a function of a network resource parameter,
   wherein each bidding component is operable to
      measure a real-time usage of each of the plurality of applications,
      estimate a derived utility as a function of a network resource parameter to produce a respective utility function corresponding to each of the plurality of applications, and
      aggregate the utility functions corresponding to each of the plurality of applications into a single aggregated utility function based on a weighted requirement of each of the plurality of applications,
   wherein a utility function corresponding to a delay-sensitive application is a sigmoid-like function, and a utility function corresponding to a delay-tolerant application is a logarithmic-like function.

2. The wireless resource allocation system of claim 1, further comprising:
   a network resource allocation component in communication with each of the one or more mobile devices,
   wherein the network resource allocation component receives respective bids from each of the one or more mobile devices and allocates resources between the mobile devices based upon the bids.

3. The wireless resource allocation system of claim 1, wherein the aggregated utility function is convex.

4. The wireless resource allocation system of claim 1, wherein the network resource allocation component computes optimal shadow prices for a plurality of network resources based on the bids in a Pareto-efficient manner.

5. The wireless resource allocation system of claim 1, wherein each bidding component is implemented as an unprivileged application operating on a respective mobile device which has visibility into running applications and their respective resource profiles.

6. The wireless resource allocation system of claim 1, wherein a derivation of utility functions is improved as a function of machine learning techniques.

7. The wireless resource allocation system of claim 1, further including a first traffic shaping element and a plurality of second traffic shaping elements, each of the plurality of second traffic shaping elements associated with a respective running application of mobile device;
   wherein the first traffic shaping element throttles data based on a resource allocation determination for the mobile device, and
   wherein the second traffic shaping elements each throttle data to its respective running application.

8. A wireless resource allocation system for a network, comprising:
   one or more mobile devices, each mobile device including a bidding component and a plurality of applications requiring data transfer,
   wherein each bidding component is operable to iteratively generate bids for resources corresponding to data transfer needs of its respective plurality of applications, wherein each bid is representative of an estimated utility as a function of a network resource parameter, wherein each bidding component is operable to measure a real-time usage of each of the plurality of applications, estimate a derived utility as a function of a network resource parameter to produce a respective utility function corresponding to each of the plurality of applications, and aggregate the utility functions corresponding to each of the plurality of applications into a single aggregated utility function based on a weighted requirement of each of the plurality of applications, wherein each bidding component is implemented as an unprivileged application operating on a respective mobile device which has visibility into running applications and their respective resource profiles.

9. The wireless resource allocation system of claim 8, further comprising:

a network resource allocation component in communication with each of the one or more mobile devices, wherein the network resource allocation component receives respective bids from each of the one or more mobile devices and allocates resources between the mobile devices based upon the bids.

10. The wireless resource allocation system of claim 8, wherein a utility function corresponding to a delay-sensitive application is a sigmoid-like function, and a utility function corresponding to a delay-tolerant application is a logarithmic-like function.

11. The wireless resource allocation system of claim 8, wherein the aggregated utility function is convex.

12. The wireless resource allocation system of claim 8, wherein the network resource allocation component computes optimal shadow prices for a plurality of network resources based on the bids in a Pareto-efficient manner.

13. The wireless resource allocation system of claim 8, wherein a derivation of utility functions is improved as a function of machine learning techniques.

14. The wireless resource allocation system of claim 8, further including a first traffic shaping element and a plurality of second traffic shaping elements, each of the plurality of second traffic shaping elements associated with a respective running application of mobile device;

wherein the first traffic shaping element throttles data based on a resource allocation determination for the mobile device, and wherein the second traffic shaping elements each throttle data to its respective running application.

* * * * *